March 11, 1924.
V. A. FISCHER
CHAIN REPAIR TOOL
Filed Jan. 25, 1922
1,486,484
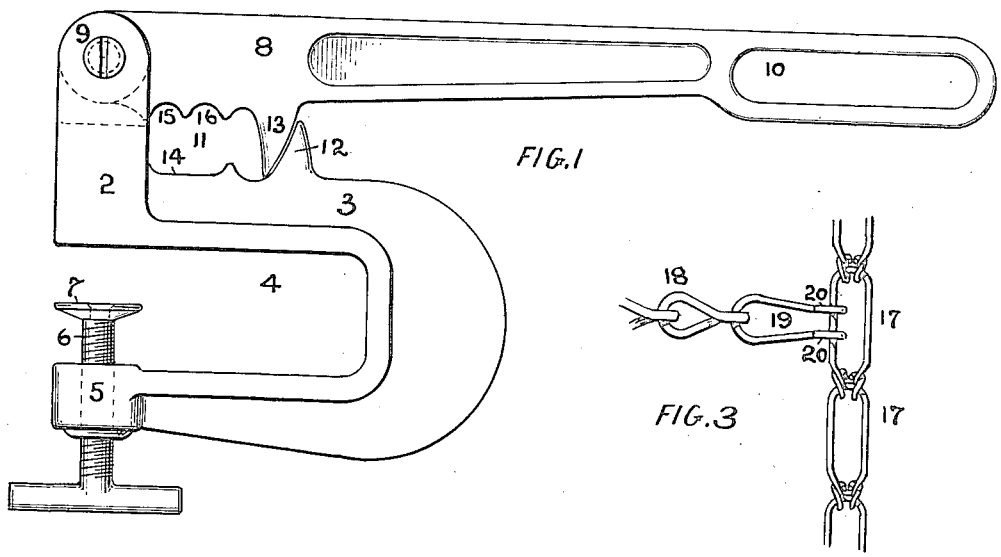
FIG.1
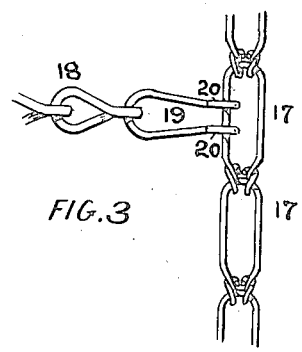
FIG.3
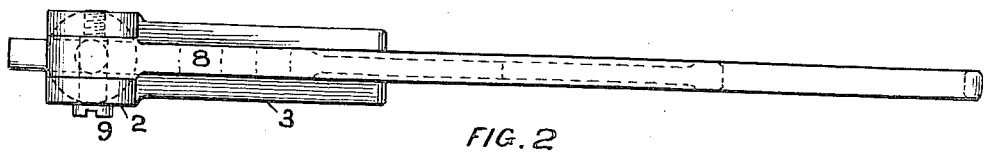
FIG.2
FIG.4
FIG.6
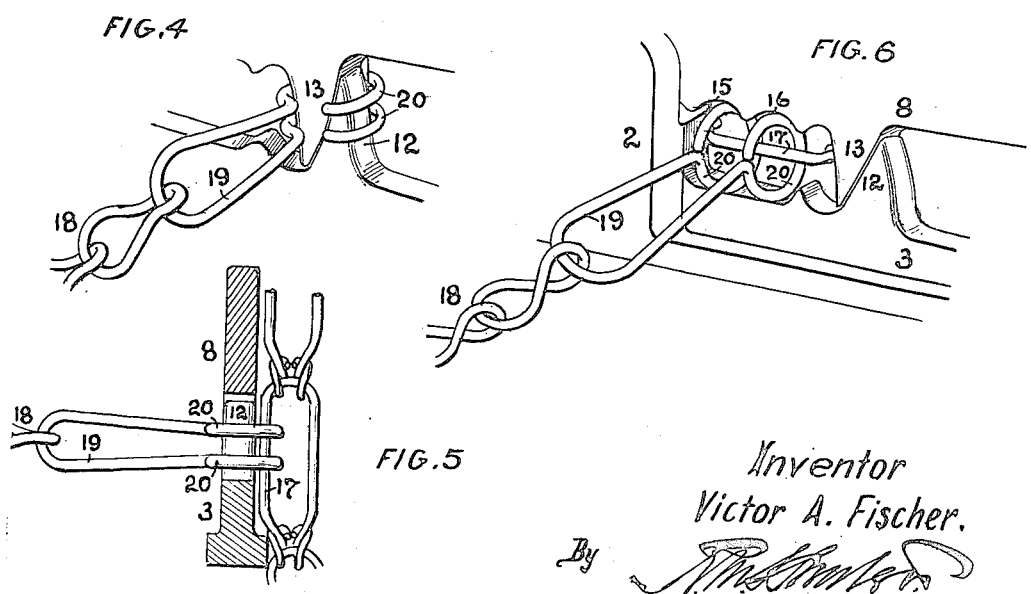
FIG.5
Inventor
Victor A. Fischer.
By
Attorney Patented Mar. 11, 1924.

1,486,484

UNITED STATES PATENT OFFICE.

VICTOR A. FISCHER, OF NEW YORK, N. Y.

CHAIN-REPAIR TOOL.

Application filed January 25, 1922. Serial No. 531,532.

*To all whom it may concern:*

Be it known that I, VICTOR A. FISCHER, a citizen of the United States, and resident of New York city, county of New York, State of New York, have invented an Improvement in Chain-Repair Tools, of which the following is a specification.

My invention has for its object the provision of means for use of an automobilist whereby he may repair "Weed" or other chain structures employed on wheels to prevent slipping or skidding of the wheels, when on the road and without the facilities of a repair shop or garage equipment. In the use of "Weed" chains, the cross chains frequently wear out and become broken and the injury must be repaired promptly as otherwise the broken links are liable to injure the tire. It is especially my object to provide a construction of portable tool which may be attached to the running board of the automobile or any other convenient structure such as a table or bench, if available, and positively operated with ease and accuracy for both opening links in removing the cross chains or a link thereof and closing links when replacing them with new chains or links as the necessities may require.

My invention consists of improvements defined in the claims and in preferred form comprising a body portion provided with a clamp for securing it temporarily in a fixed position for use and having hinged thereto a hand operable lever, the said lever and body portion respectively provided with cooperating parts comprising wedge shaped prongs adapted to be movable relatively in respect to each other to gradually widen their combined widths for the purpose of spreading or expanding the looped portion or portions of a chain link and preferably also further respectively provided with supporting and guiding portions in opposed relation by which an open link may have its looped portions bent inward to close the loop or loops thereof.

My invention also comprehends details of construction which, together with the features above specified, will be better understood by reference to the following specification and accompanying drawings forming a part thereof.

Referring to the drawings: Fig. 1 is a side view of my improved chain repair tool; Fig. 2 is a plan view of the same; Fig. 3 is a view of a portion of a "Weed" chain, the repairing of which my improved tool is especially intended; Fig. 4 is a perspective view of a portion of my improved tool in the act of expanding a link for its removal; Fig. 5 is a vertical sectional view through the tool when in the act of expanding a link as in Fig. 4; and Fig. 6 is a perspective view showing a portion of my improved tool in the act of closing the loops or eyes of a link as when applying a new link or cross chain.

3 is the body and is recessed as at 4 to provide a lateral jaw, the lower arm having a hub 5 through which extends a clamping screw 6 having a rotatable clamping plate 7 at its top by which the body may be clamped to the running board of an automobile. The upper part of the body is provided with an upward frame 2, slotted at its top to provide a bifurcated structure which receives the hinged end of the hand lever 8, said lever being fulcrumed on the transverse pin 9 having one end screw threaded to insure its retention upon the bifurcated upright portion 2. The lever 8 preferably extends in the direction over the body 3 and away from the clamp opening 4, so that when the device is clamped in position on the running board of the automobile, the lever and operative parts of the device will be directed outward for more convenient operation. The lever is desirably provided at its free end with a looped portion 10 to lighten it and at the same time to give greater depth to insure a more firm grasp without cramping the fingers.

Referring now to the cooperating parts of the body and lever which come into co-action when operating upon the chain links, it will be seen that the body 3 adjacent to the upright part 2 is made with a horizontal bed 14 upturned at each end and also has an upwardly extending triangularly shaped prong 12, the apex whereof is at the top and the side next to the pivot 9 preferably curved from the axis of the pivot as a center, as will be understood by reference to Fig. 1. The lever 8 has its lower opposing edge formed with a downwardly extending triangular shaped prong 13 preferably curved on its outer edge to correspond to the curvature of the prong 12. When the prongs 12 and 13 are in the relation shown in Fig. 1, they cooperate to provide the greatest combined width, but when the lever 8 is raised and the pointed ends of the prongs are just overlapping, there is then provided the least combined width. The lever 8 is also further provided with the downwardly operating edge between the prong and hinged end provided with two transversely arranged parallel grooves 15 and 16 in opposed position to the part 14 on the body part 3.

Before explaining the use of my improved tool, I will describe the general construction of the chain upon which it is to operate. Referring to Fig. 3, the links 17 are parts of the usual circumferential chain members (of which there are two), said members being connected at intervals by transverse chain sections 18 having the special links 19 for connection with the side bars of the links 17 of the circumferential members. The links 19 have two parallel arms terminating in looped or ring shaped eye portions 20.

The operation of the tool is shown in Figs. 4, 5 and 6, and may be stated as follows: If the links 19 are to be disconnected from the chain links 17, the lever 8 is raised sufficiently to permit the eyes 20 of link 19 to be placed over the prong 12 on the body 3 and then the lever is depressed, causing its prong 13 to enter the eyes and owing to the wedge shape, spread the eyes and thus expand them as shown in Figs. 4 and 5. When this expansion of the eyes 20 has been accomplished, they may be readily detached from the links 17. When it is desired to couple in new links 19 (which are normally open), the open eyes 20 of such links, when assembled with the links 17, are arranged vertically, being respectively received in the grooves 15 and 16 on the lever 8 and resting on the horizontal bed 14 on the body portion. Assuming that these eyes 20 of the link 19 are first connected to the links 17, as in Fig. 3, they are subjected to pressure produced by the depression of the lever 8 for closing the eyes, as indicated in Fig. 6, for permanently connecting said links 19 of the cross chains with the links 17 of the circumferential chains.

While I have described my invention for special use in connection with repairs of "Weed" chains, I do not intend to be restricted to that use, as the device may be employed in connection with chains of other makes for same purpose and may also be used in general repairing of chains having split links.

It will be understood that while the prongs 15 and 16 are shown as made of triangular shape, this is not essential, as it is only necessary that when the eye is upon one of the prongs the point of the other may also enter. By making the prongs triangular they are stronger and, moreover, the eyes are better positioned on the prong 12 to provide space within the eyes into which the prong 13 may enter.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:

1. In a tool for repairing chains, two parts hinged together at one of their respective ends and having all the remaining operative portions extending in the same direction wholly to one side of the hinge, said two parts shaped to form clamping jaws in direct alinement, said jaws each provided with a prong respectively arranged at different distances from the hinge and overlapping, the total combined width across the two prongs being least when the ends of the prongs are in close relation and greatest when the prongs are in maximum overlapping relation, and wherein further, the two jaw parts of the tool intermediate of the prongs and hinge are respectively provided with opposing clamping portions and in which at least one of said portions is provided with two transverse grooves, said opposing portions and the prongs being all in the same plane.

2. The invention according to claim 1, wherein further, one of the hinged parts is extended as a lever and the other part provided with an adjustable clamp arranged at a lower level than the prongs by which the tool may be clamped to a support when operating the other or lever part.

3. In a portable tool for repairing chains, the combination of two parts hinged together and having their operative portions arranged to the same side of the hinge, one part constituting a movable hand lever at the upper portion of the tool and the other or lower portion constituting a fixed body when in use and having an adjustable clamp whereby it may be firmly clamped in position during the use of the tool, said lever relatively adjustable to and from the body part and said lever and body part further provided with cooperating link spreading prongs and clamping jaws for respectively expanding and compressing the eye portions of chain links, said spreading prongs and clamping jaws all in the same plane and located to the same side of the hinge as is the lever.

In testimony of which invention, I hereunto set my hand.

VICTOR A. FISCHER.